US012676033B2

(12) United States Patent
Beisswenger et al.

(10) Patent No.: US 12,676,033 B2
(45) Date of Patent: Jul. 7, 2026

(54) METHOD FOR DETERMINING A PERMISSIBLE STATE VARIABLE BOUNDARY VALUE OF A TECHNICAL SYSTEM IN A VEHICLE

(71) Applicant: Robert Bosch GmbH, Stuttgart (DE)

(72) Inventors: Markus Beisswenger, Schwaebisch Hall (DE); Patrick Lott, Hassmersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 341 days.

(21) Appl. No.: 18/062,717

(22) Filed: Dec. 7, 2022

(65) Prior Publication Data

US 2023/0230427 A1 Jul. 20, 2023

(30) Foreign Application Priority Data

Jan. 19, 2022 (DE) ..................... 10 2022 200 560.0

(51) Int. Cl.
*G07C 5/08* (2006.01)

(52) U.S. Cl.
CPC .................................. *G07C 5/0808* (2013.01)

(58) Field of Classification Search
CPC ............. G07C 5/0808; B60W 50/0205; B60R 16/0232
See application file for complete search history.

(56) References Cited

U.S. PATENT DOCUMENTS

| | | | | |
|---|---|---|---|---|
| 12,233,856 B2* | 2/2025 | Qin | B60W 30/085 | |
| 2015/0330792 A1* | 11/2015 | Stählin | G01C 21/188 | 701/479 |
| 2016/0039455 A1* | 2/2016 | Zeller | B62D 6/001 | 701/41 |
| 2019/0114437 A1* | 4/2019 | Kim | G06F 21/577 | |
| 2019/0283768 A1* | 9/2019 | Das | B60W 30/10 | |
| 2019/0391187 A1* | 12/2019 | Barner | G05F 1/46 | |
| 2023/0185904 A1* | 6/2023 | Chitnis | G06F 21/52 | 726/26 |

* cited by examiner

*Primary Examiner* — Scott A Browne
*Assistant Examiner* — Shahira Baajour
(74) *Attorney, Agent, or Firm* — NORTON ROSE FULBRIGHT US LLP

(57) ABSTRACT

A method for determining a permissible state variable boundary value of a technical system in a vehicle. The controllability of a subsystem is ascertained on the basis of an ASIL index and is determined from the controllability of the state variable boundary value.

17 Claims, 1 Drawing Sheet

METHOD FOR DETERMINING A PERMISSIBLE STATE VARIABLE BOUNDARY VALUE OF A TECHNICAL SYSTEM IN A VEHICLE

CROSS REFERENCE

The present application claims the benefit under 35 U.S.C. § 119 of German Patent Application No. DE 10 2022 200 560.0 filed on Jan. 19, 2022, which is expressly incorporated herein by reference in its entirety.

FIELD

The present invention relates to a method for determining a permissible state variable boundary value of a technical system in a vehicle, by which a driving state variable in the vehicle can be influenced.

BACKGROUND INFORMATION

It is conventional to assign technical systems in vehicles a risk classification index that characterizes the potential hazard of the technical system. The risk classification index, which is referred to as ASIL (Automotive Safety Integrity Level), can take different values depending on the potential hazard for various technical systems in the vehicle. A distinction is made between four ASIL indexes, A, B, C and D, where ASIL A represents a relatively low potential hazard and ASIL D represents a high potential hazard. Technical systems in vehicles having high safety relevance, such as the brake system or the steering system, are usually rated ASIL D.

The ASIL index is made up of parameters for the probability of occurrence in relation to the frequency distribution of a state variable of a driving situation, the ability to control a hazardous situation in the event of a malfunction in this driving situation, and the degree of severity of the hazardous situation. Each of these parameters is assigned a numeric value, and the ASIL index results from the sum of these numeric values.

SUMMARY

Using the method according to the present invention, it is possible to determine, based on ASIL indexes, a permissible state variable boundary value of a technical system in a vehicle in such a way that the ASIL index of the technical system in the vehicle can be maintained. According to an example embodiment of the present invention, in the method, which is carried out in multiple steps, first a subsystem is considered that is part of the technical system but is rated within the technical system with its own ASIL index. In a first step an ASIL index is assigned to the subsystem, either by definition, by evaluating the subsystem's potential hazard, or by determination or ascertaining, by carrying out an evaluation based on various parameters of the subsystem, from which the ASIL indicator can be determined.

The subsystem can form a unit within the relevant technical system and can contribute to realizing the execution of the technical system. The subsystem is, for example, a sensor system in the vehicle that ascertains one or more driving state variables during the trip, such as the transverse acceleration of the vehicle.

Once the ASIL index of the subsystem has been determined, in a subsequent step the controllability of the subsystem is determined, which together with the probability of occurrence and the degree of severity is one of the three parameters that additively make up the ASIL index. The controllability of the subsystem is determined from the previously ascertained ASIL index of the subsystem minus the current probability of occurrence in relation to the frequency distribution of a state variable of the subsystem and minus the current degree of severity, which is determined from a state variable of the subsystem. The probability of occurrence of the subsystem is preferably determined on the basis of field data or empirical data of the relevant state variable of the subsystem, where the field data or empirical data are assumed as known and are known, for example, from earlier reference trips that were made. The degree of severity of the subsystem is determined as an example on the basis of an empirical state of data from a state variable of the subsystem. Preferably, the same state variable, for example the transverse acceleration of the vehicle, forms the basis of the probability of occurrence and the degree of severity of the subsystem.

After the ascertaining of the controllability of the subsystem, in the next step the value of the controllability is used in the ascertaining of the permissible state variable boundary value of the technical system. Here, in addition to the controllability of the subsystem, the ASIL index that holds for the overall technical system is also taken into account. Alternatively or in addition, the ASIL index for the current driving situation in relation to the entire technical system can be taken into account.

This procedure is used to determine permissible state value boundary values of the technical system on the basis of relatively little initial information. Knowledge of the ASIL indexes of the subsystem and of the technical system, the probability of occurrence and the degree of severity of the subsystem, and a functional or empirical relation of the sought state variable boundary value with the controllability of the subsystem and the associated ASIL index of the technical system is required. The controllability of the subsystem, which is determined in the method according to the present invention, is used in the ascertaining of the sought state variable boundary value.

The method is applicable to various technical systems, including various subsystems, and to various driving situations. This includes, for example, application to driving situations that include a braking process, an acceleration process, and/or a steering process. Correspondingly, the method is applicable to dynamic driving situations in the longitudinal direction and/or transverse direction. The relevant state variable of the subsystem from which the current degree of severity of the subsystem is ascertained is for example the transverse acceleration of the vehicle.

The subsystem, which acts as a subsystem of the technical system in the vehicle, is, for example, a sensor system in the vehicle via which one or more driving state variables concerning the longitudinal dynamics and/or transverse dynamics of the vehicle, and possibly also the vertical dynamics, can be ascertained. The sensor system is for example capable of ascertaining, inter alia, the transverse acceleration of the vehicle. Depending on the embodiment, the sensor system can be assigned a particular ASIL index, for example ASIL B, or can be assigned a higher ASIL index, for example ASIL C, by combining different sensor sources. Here the ASIL index can relate to a particular state variable ascertained using the sensor system, for example the transverse acceleration.

The method according to the present invention can be applied to various technical systems in the vehicle, and to various driving situations. In an advantageous embodiment of the present invention, the technical system in the vehicle to which the method relates is an autonomous or partly autonomous driver assistance system. This may be, for example, an electronic stability regulation system, such as an electronic stability program, or ESP. In the case of a driver assistance system, the technical system can include various technical units, such as the brake system and the drive system in the vehicle.

According to an advantageous embodiment of the present invention, the current probability of occurrence of the state variable of the subsystem that has to be ascertained for the controllability of the subsystem and that relates to the frequency distribution of the state variable can be determined from a characteristic curve that shows the distribution of this state variable relative to the same state variable. This is advantageously a characteristic curve based on empirical data.

According to a further advantageous embodiment of the present invention, the permissible state variable boundary value relates to an interfering variable of the technical system. This is for example the interfering yaw moment of the vehicle. According to a further advantageous embodiment, the calculation of the permissible state variable boundary value based on the controllability of the subsystem can be calculated from an empirical relation from the controllability. Alternatively, a physical relation can also be used.

According to a further advantageous embodiment of the present invention, the controllability of the subsystem is set to a value that is smaller than the ASIL summed index of the subsystem minus the current probability of occurrence minus the current degree of severity. For safety reasons, the controllability is set to a lower value, in particular is reduced by the value 1, than the value that results from the ASIL summed index minus the probability of occurrence and minus the degree of severity.

In addition, the present invention relates to a control device that includes means that are designed to carry out the method described above. The means include at least one storage unit, at least one computing unit, a control device input, and a control device output. Using the control device, in particular adjustable components of the technical system can be controlled, such as, in the embodiment of the technical system as an electronic stability program, components of the brake system such as an ESP pump. In the control device, the state variable boundary value can be taken into account in the execution for example of a driving dynamics regulation system.

In addition, the present invention relates to a technical system in a vehicle such as an ESP system, the technical system being capable of influencing a driving state variable or a plurality of driving state variables. The technical system is equipped with a control device as described above.

In addition, the present invention relates to a computer program product having a program code that is designed to carry out the method steps described above. The computer program product runs in the control device described above.

Further advantages and advantageous embodiments of the present invention are disclosed herein.

DETAILED DESCRIPTION OF EXAMPLE EMBODIMENTS

Figure 1:
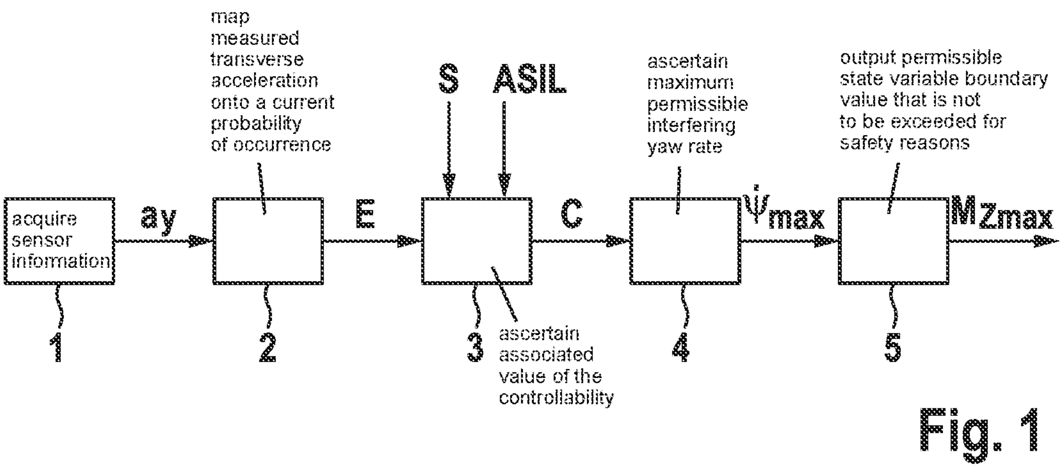
FIG. 1 shows a schematic diagram with method steps for determining a permissible state variable boundary value of a technical system in a vehicle, taking into account ASIL indexes, according to an example embodiment of the present invention.

The sequence of the method for determining a permissible state variable boundary value is shown in FIG. 1. The state variable boundary value relates to a technical system in a vehicle, such as an electronic stability program ESP, with which an autonomous intervention in the brake system can be carried out. The ESP system is based on sensor information acquired in block 1 via a sensor system of the vehicle. This information is, in particular, driving state variables in the vehicle longitudinal and transverse direction, on the level of speed and acceleration. The yaw moment about the vehicle vertical axis can also be acquired.

Block 1, with the sensor system, is a subsystem in the technical system (ESP system) of the vehicle. The subsystem according to block 1 can be regarded as a part of the technical system, the sensor information also being provided to further systems in vehicles.

The aim of the method is to provide, at the output of block 5, a permissible state variable boundary value that is not to be exceeded in the technical system for safety reasons. In the specific exemplary embodiment according to FIGS. 1 and 2, the permissible state variable boundary value is a permissible interfering yaw moment.

The method uses ASIL indexes both for the subsystem of the sensor system according to block 1 and for the overall technical system. The ASIL indexes are each made up additively of parameters for the probability of occurrence E in relation to the frequency distribution of a state variable, the controllability C of a hazardous situation in the event of a malfunction in the driving situation, and the degree of severity S of the hazardous situation. The ASIL summed index N, from the sum of the probability of occurrence E, controllability C, and degree of severity S, can assume a maximum value of 10. The probability of occurrence E lies between the whole-numbered values 1 and 4, where 1 stands for extremely rare and 4 stands for constant. The controllability C lies between the whole-numbered values 0 and 3, where 0 means controllable by anyone and 3 means less than 90% controllable for a group of persons.

The degree of severity S lies between the whole-numbered values 0 and 3, where 0 means no hazard and 3 means potentially severe injury and death.

The ASIL summed index N standardly lies in a range of values between 7 and 10. N=7 is designated ASIL A, N=8 is ASIL B, N=9 is ASIL C and N=10 is ASIL D. ASIL A is the lowest safety level and ASIL D is the highest safety level.

Safety-relevant technical systems in the vehicle such as the brake system are standardly rated ASIL D.

In order to avoid a hazardous situation in a technical system with adequate safety, the sum of the parameters for the probability of occurrence E, controllability C, and degree of severity S has to be smaller than the associated ASIL summed index N.

$$E+C+S<n\ (ASIL)$$

Because for example the technical system is rated ASIL D (N=10), the sum of E+C+S must not be greater than 9.

The sensor system according to block 1 supplies a transverse acceleration value $a_y$ for which, in the exemplary embodiment, an index ASIL C is set. In the next method step according to block 2 the measured transverse acceleration $a_y$ is mapped onto a current probability of occurrence E, which is done with the aid of empirical field data. In the exemplary embodiment, the probability of occurrence E has the value 3.

In the following method step according to block 3, the associated value of the controllability C is ascertained. Block 3 receives, as input variable, the probability of occurrence E, the degree of severity S, and the ASIL index of the subsystem from block 1, i.e. the sensor system. For safety reasons, the degree of severity S is set to a maximum value of 3. The ASIL index is C, which corresponds to the ASIL summed index N=9.

Using these input variables, from the relation $$C < n\ (ASIL)$$

the controllability C of the subsystem according to block 1 can be ascertained. For N=9, E=3, and S=3, from the above inequality there results a value for the controllability C that has to be smaller than 3 and is thus set to the value 2.

This value for the controllability C is an input variable to the following block 4, in which, from the controllability C, a maximum permissible interfering yaw rate $\dot{\psi}_{max}$ is ascertained that establishes the relation between the effect of an erroneous intervention and the resulting controllability. The interfering yaw rate $\dot{\psi}_{max}$ can be ascertained from an empirical relation.

The permissible interfering yaw rate $\dot{\psi}_{max}$ ascertained in block 4 is an input variable to the following block 5, in which a permissible interfering yaw moment $M_{Zmax}$ is ascertained. This takes place on the basis of a physical relation, for example based on a mathematical analogous model of the vehicle. Both the ascertaining of the interfering yaw rate $\dot{\psi}_{max}$ in block 4 and the ascertaining of the interfering yaw moment $M_{Zmax}$ in block 5 are based on an ASIL index D for the technical system.

Figure 2:
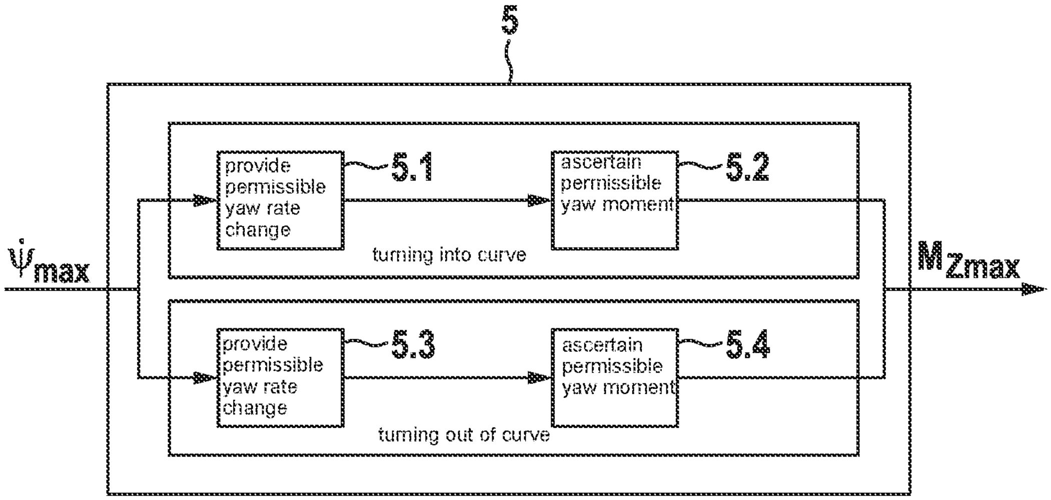
FIG. 2 shows the final block of FIG. 1 in an enlarged representation.

FIG. 2 shows block 5 in detail. The cases of turning into a curve (blocks 5.1, 5.2) and turning out of a curve (blocks 5.3, 5.4) are considered separately, due to the physics and the resulting different amplitudes. However, the physical models used as a basis for the cases of turning into a curve and turning out of a curve are identical; they merely have different signs for the permissible interfering yaw rate $\dot{\psi}_{max}$ at the input side.

In block 5.1, for the case of turning into a curve there first takes place a permissible yaw rate change that is given as input variable to block 5.2, in which the permissible yaw moment for the case of turning into a curve is ascertained from a physical relation. In blocks 5.3 and 5.4, a corresponding ascertaining for the case of turning out of a curve takes place. At the output of block 5, a corridor is obtained of the permissible interfering yaw moments $M_{Zmax}$ that is bounded by the permissible yaw moments for the cases of turning into and turning out of a curve.

What is claimed is:

1. A method for determining a permissible state variable boundary value of a technical system in a vehicle, via which a state variable of a subsystem of the technical system can be influenced, based on an Automotive Safety Integrity Level (ASIL) index that characterizes a potential hazard of the technical system and is made up of parameters for:

a probability of occurrence in relation to a frequency distribution of the state variable of the subsystem, a controllability of a risk situation in the case of a malfunction in the driving situation, and a degree of severity of the risk situation, each ASIL index being assigned an ASIL summed index of a sum of the probability of occurrence, controllability, and degree of severity, the method comprising the following steps:

defining or determining the ASIL index of the subsystem of the technical system;

ascertaining a controllability of the subsystem from the ASIL summed index of the subsystem minus a current probability of occurrence in relation to a frequency distribution of a state variable of the subsystem and minus a current degree of severity ascertained from the state variable of the subsystem; and ascertaining the permissible state variable boundary value of the technical system based on the ascertained controllability of the subsystem and taking into account the ASIL index specified for the technical system and/or for a current driving situation, controlling a subsystem of the technical system in the vehicle based on the ascertained permissible state variable boundary value, wherein controlling the subsystem includes adjusting one or more vehicle components including at least one of a brake system, a drive system, or a steering system, wherein the determining the probability of occurrence in relation to the frequency distribution of the state variable of the subsystem includes determining the probability of occurrence based on empirical field data or reference trip data associated with the state variable, wherein the permissible state variable boundary value includes a limit on a driving state variable including at least one of a vehicle yaw moment, a transverse acceleration, or a longitudinal acceleration, and wherein the controlling reduces a likelihood or a severity of a hazardous driving situation in the vehicle.

2. The method as recited in claim 1, wherein the driving situation is a braking process and/or a steering process in the vehicle.

3. The method as recited in claim 1, wherein the subsystem is a sensor system in the vehicle.

4. The method as recited in claim 1, wherein the technical system in the vehicle is an autonomous or partly autonomous driver assistance system.

5. The method as recited in claim 1, wherein the technical system in the vehicle is an electronic stability control system.

6. The method as recited in claim 1, wherein the technical system in the vehicle is an electronic stability program (ESP).

7. The method as recited in claim 1, wherein the probability of occurrence in relation to the frequency distribution of the state variable of the subsystem is determined from a characteristic curve that indicates a distribution of the state variable in relation to the state variable.

8. The method as recited in claim 1, wherein the state variable of the subsystem is a transverse acceleration of the vehicle.

9. The method as recited in claim 3, wherein the permissible state variable boundary value, which is ascertained from the ascertained controllability of the subsystem, relates to an interfering variable of the technical system.

10. The method as recited in claim 1, wherein the permissible state variable boundary value, which is ascertained from the ascertained controllability of the subsystem, relates to an interfering yaw moment.

11. The method as recited in claim 1, wherein the permissible state variable boundary value of the technical system, which is ascertained on based on the controllability of the subsystem, is calculated from an empirical relation from the controllability of the subsystem.

12. The method as recited in claim 1, wherein the permissible state variable boundary value of the technical system, which is ascertained based on the controllability of the subsystem, is calculated from a physical relation directly or indirectly from the controllability of the subsystem.

13. The method as recited in claim 1, wherein the controllability of the subsystem is set to a value that is smaller than the ASIL summed index of the subsystem minus the current probability of occurrence minus the current degree of severity.

14. A control device configured to determine a permissible state variable boundary value of a technical system in a vehicle, via which a state variable of a subsystem of the technical system can be influenced, based on an Automotive Safety Integrity Level (ASIL) index that characterizes a potential hazard of the technical system and is made up of parameters for:

a probability of occurrence in relation to a frequency distribution of the state variable of the subsystem, a controllability of a risk situation in the case of a malfunction in the driving situation, and a degree of severity of the risk situation, e each ASIL index being assigned an ASIL summed index of a sum of the probability of occurrence, controllability, and degree of severity, the control device being configured to:

define or determine the ASIL index of the subsystem of the technical system;

ascertain a controllability of the subsystem from the ASIL summed index of the subsystem minus a current probability of occurrence in relation to a frequency distribution of a state variable of the subsystem and minus a current degree of severity ascertained from the state variable of the subsystem; and ascertain the permissible state variable boundary value of the technical system based on the ascertained controllability of the subsystem and taking into account the ASIL index specified for the technical system and/or for a current driving situation, controlling a subsystem of the technical system in the vehicle based on the ascertained permissible state variable boundary value, wherein controlling the subsystem includes adjusting one or more vehicle components including at least one of a brake system, a drive system, or a steering system, wherein the determining the probability of occurrence in relation to the frequency distribution of the state variable of the subsystem includes determining the probability of occurrence based on empirical field data or reference trip data associated with the state variable, wherein the permissible state variable boundary value includes a limit on a driving state variable including at least one of a vehicle yaw moment, a transverse acceleration, or a longitudinal acceleration, and wherein the controlling reduces a likelihood or a severity of a hazardous driving situation in the vehicle.

15. The technical system as recited in claim 14, wherein the technical system is an electronic stability program (ESP) system.

16. A technical system in a vehicle for influencing a state variable, comprising:

a control device configured to determine a permissible state variable boundary value of the technical system, via which the state variable of a subsystem of the technical system can be influenced, based on an Automotive Safety Integrity Level (ASIL) index that characterizes a potential hazard of the technical system and is made up of parameters for:

a probability of occurrence in relation to a frequency distribution of the state variable of the subsystem, a controllability of a risk situation in the case of a malfunction in the driving situation, and a degree of severity of the risk situation, each ASIL index being assigned an ASIL summed index of a sum of the probability of occurrence, controllability, and degree of severity, the control device being configured to:

define or determine the ASIL index of the subsystem of the technical system;

ascertain a controllability of the subsystem from the ASIL summed index of the subsystem minus a current probability of occurrence in relation to a frequency distribution of a state variable of the subsystem and minus a current degree of severity ascertained from the state variable of the subsystem; and ascertain the permissible state variable boundary value of the technical system based on the ascertained controllability of the subsystem and taking into account the ASIL index specified for the technical system and/or for a current driving situation, controlling a subsystem of the technical system in the vehicle based on the ascertained permissible state variable boundary value, wherein controlling the subsystem includes adjusting one or more vehicle components including at least one of a brake system, a drive system, or a steering system, wherein the determining the probability of occurrence in relation to the frequency distribution of the state variable of the subsystem includes determining the probability of occurrence based on empirical field data or reference trip data associated with the state variable, wherein the permissible state variable boundary value includes a limit on a driving state variable including at least one of a vehicle yaw moment, a transverse acceleration, or a longitudinal acceleration, and wherein the controlling reduces a likelihood or a severity of a hazardous driving situation in the vehicle.

17. A non-transitory computer-readable medium on which is stored a computer program having program code for determining a permissible state variable boundary value of a technical system in a vehicle, via which a state variable of a subsystem of the technical system can be influenced, based on an Automotive Safety Integrity Level (ASIL) index that characterizes a potential hazard of the technical system and is made up of parameters for:

a probability of occurrence in relation to a frequency distribution of the state variable of the subsystem, a controllability of a risk situation in the case of a malfunction in the driving situation, and a degree of severity of the risk situation, each ASIL index being assigned an ASIL summed index of a sum of the probability of occurrence, controllability, and degree of severity, the program code, when executed by a computer, causing the computer to perform the following steps:

defining or determining the ASIL index of the subsystem of the technical system;

ascertaining a controllability of the subsystem from the ASIL summed index of the subsystem minus a current probability of occurrence in relation to a frequency distribution of a state variable of the subsystem and minus a current degree of severity ascertained from the state variable of the subsystem; and ascertaining the permissible state variable boundary value of the technical system based on the ascertained controllability of the subsystem and taking into account the ASIL index specified for the technical system and/or for a current driving situation, controlling a subsystem of the technical system in the vehicle based on the ascertained permissible state variable boundary value, wherein controlling the subsystem includes adjusting one or more vehicle components including at least one of a brake system, a drive system, or a steering system, wherein the determining the probability of occurrence in relation to the frequency distribution of the state variable of the subsystem includes determining the probability of occurrence based on empirical field data or reference trip data associated with the state variable, wherein the permissible state variable boundary value includes a limit on a driving state variable including at least one of a vehicle yaw moment, a transverse acceleration, or a longitudinal acceleration, and wherein the controlling reduces a likelihood or a severity of a hazardous driving situation in the vehicle.

* * * * *